United States Patent [19]

Blaisdell et al.

[11] Patent Number: 5,074,699
[45] Date of Patent: Dec. 24, 1991

[54] DISENGAGING BALL JOINT

[76] Inventors: Richard W. Blaisdell, 3012 Fairmount Ave., San Diego, Calif. 92105; David A. Baer, 4251 Felton St., San Diego, Calif. 92104; Shiv P. Singh, 2275 Bratton Valley Rd., Jamul, Calif. 92035

[21] Appl. No.: 321,173

[22] Filed: Mar. 9, 1989

[51] Int. Cl.$^5$ ............................................. F16C 11/06
[52] U.S. Cl. .................................. 403/122; 403/135; 403/353
[58] Field of Search ............... 403/122, 141, 131, 353, 403/76, 77, 135, 133, 124

[56] References Cited

U.S. PATENT DOCUMENTS

| | | | |
|---|---|---|---|
| 2,708,591 | 5/1955 | Schiesel | 403/77 X |
| 3,329,454 | 7/1967 | Melton et al. | |
| 3,342,513 | 9/1967 | Melton et al. | |
| 3,400,408 | 9/1968 | Garcia | |
| 3,433,510 | 3/1969 | Hulterstrum | 403/77 |
| 3,497,248 | 2/1970 | Teramuchi | |
| 4,072,320 | 2/1978 | Powell | 403/122 X |
| 4,105,344 | 8/1978 | Rousom | |
| 4,225,261 | 9/1980 | Marx | 403/122 |
| 4,360,284 | 11/1982 | Brandenburg | 403/135 X |
| 4,410,295 | 10/1983 | Ersoy et al. | 403/122 |
| 4,478,531 | 6/1984 | Levinson et al. | 403/77 |
| 4,712,814 | 12/1987 | Petterson | 403/353 X |

FOREIGN PATENT DOCUMENTS 2085068  4/1982  United Kingdom ............... 403/122

Primary Examiner—Peter M. Cuomo

[57] ABSTRACT

A quick release type of ball joint providing 3-axes motion, which comprises a socket and a ball is disclosed. The quick release feature is provided by a slot in the socket and a recessed locking slot on the stem of the ball. The ball joint thus provided is simple in design, easy to manufacture and reliable in performance. The quick release feature permits easy disengagement enhancing flexibility of application.

5 Claims, 2 Drawing Sheets

DISENGAGING BALL JOINT

BACKGROUND—FIELD OF INVENTION

This invention relates to a means for transferring axial forces with freedom of movement along three axes.

BACKGROUND—DESCRIPTION OF PRIOR ART

A ball and socket joint is a common means to achieve the goal stated above. The following U.S. Pat. Nos. 2,085,068; 2,708,591; 3,329,454; 3.342,513; 3,400,408; 3,433,510; 4,105,344; 4,225,261; 4,410,295; 4,712,814 4,478,531 are directed to such joints. They have the ability to transmit forces without restricting motion. The magnitude of the forces governs the choice of materials used in fabrication of the joint. When the magnitude of the force is small, plastic components have been used for joints.

These joints usually have a casting called a socket, a male fitting called a ball and some means of keeping the ball in close contact with the socket. A common method of assembly is through the use of threaded components. The U.S. patents referenced above use threaded fasteners as retainers. This results in higher fabrication cost, multiple parts, and complex assembly procedures.

Some of these joints include forked castings and spring clamps for assembly such as U.S. Pat. No. 3,497,248. A forked casing involves a high risk of soiling and the spring clamps require manual adjustment for assembly of the joint.

OBJECTS AND ADVANTAGES

The current invention eliminates the risk of soiling. It has a closed socket with a slot for quick disengagement of the joint without any manual adjustment. This feature also provides a joint with a small number of parts. The design is easy to assemble, manufacture and build, plus it requires little or no maintenance.

It is an objective of this invention to provide a socket and ball pivot joint which has a means for quick disengagement.

The further objective of this invention is to provide a ball joint which can be easily connected to other structural members for various applications.

Another objective of this invention is to provide a ball joint which is simple in design, rugged in construction and economical to manufacture.

Yet a further objective of this invention is to provide a ball joint that will permit maximum freedom of motion along all three spatial axes.

DRAWING FIGURES

DESCRIPTION—FIGS. 1 TO 6

Figure 1:
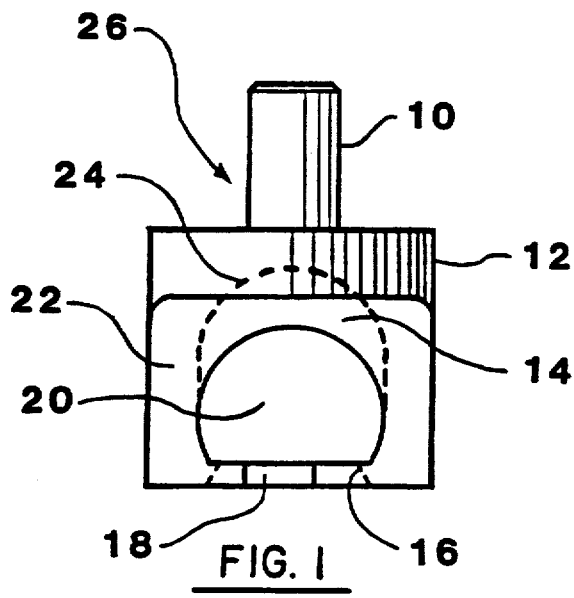
FIG. 1 shows an end view of the socket.
Figure 3:
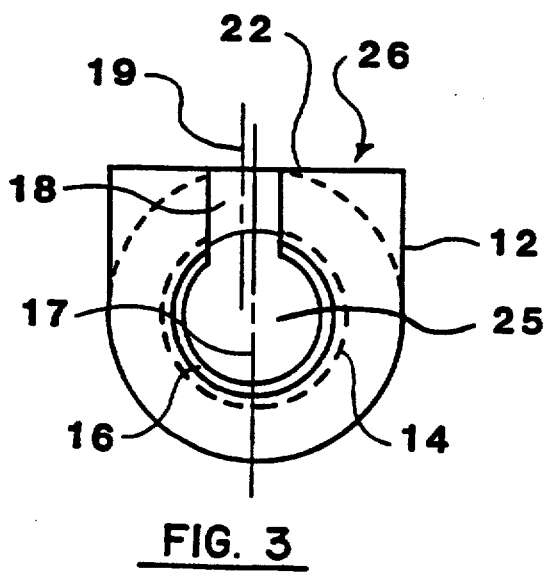
FIG. 3 illustrates the bottom view of the socket showing the stem opening of the housing through which the ball stem protrudes.

FIGS. 1 and 3 show plan and elevation views of the socket 26 which consists of a socket stem 10 and housing 12. The housing 12 is comprised of the ball and recess 14, stem guide 16, stem slot 18, and ball slot 20. The ball slot 20, flat face 22, the ball seat 24, and the stem guide 25 is located in the flat face 22 of the housing 12. The ball recess 14 is bounded by the ball seat 24 and stem opening 25 in side the housing 12.

Figure 2:
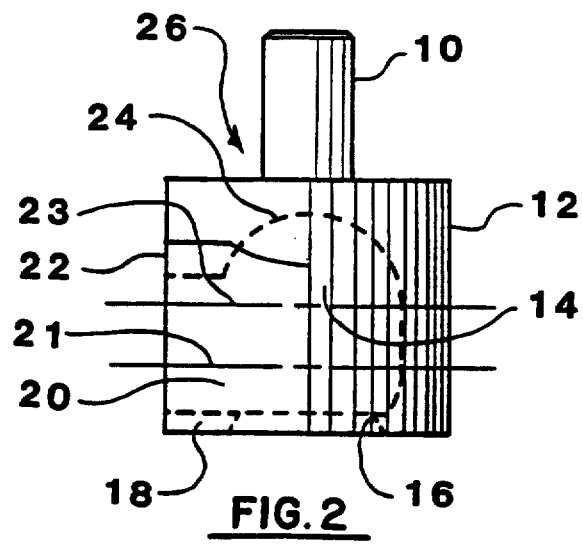
FIG. 2 shows a side view of the socket

FIG. 2 illustrates the relationship of centerline 21 and centerline 23. Centerline 21 passes through the spherical center of the ball slot 20. Centerline 23 passes through the spherical center of the ball seat 24. FIG. 3 shows a similar relationship between the housing centerline 17 and the stem slot centerline 19.

Figure 4:
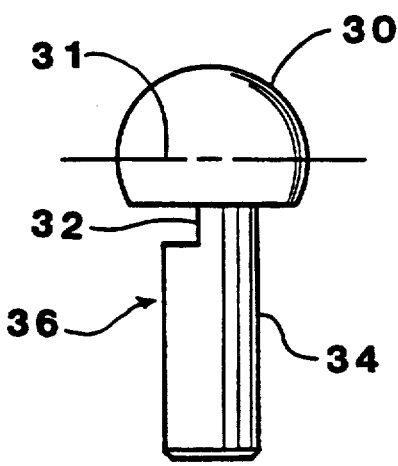
FIGS. 4 and 5 depict the ball with its ball shaped head and ball stem with locking slot.
Figure 5:
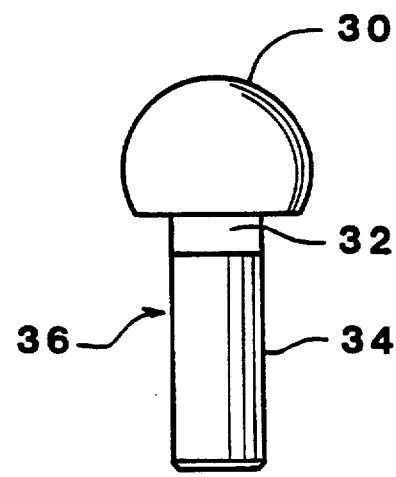

FIGS. 4 and 5 show the ball 36 which consists of the ball shaped head 30, locking slot 32 and the ball stem 34 with a locking slot 32 FIG. 4 also shows centerline 31 which passes through the spherical center of the ball shaped head 30.

Figure 6:
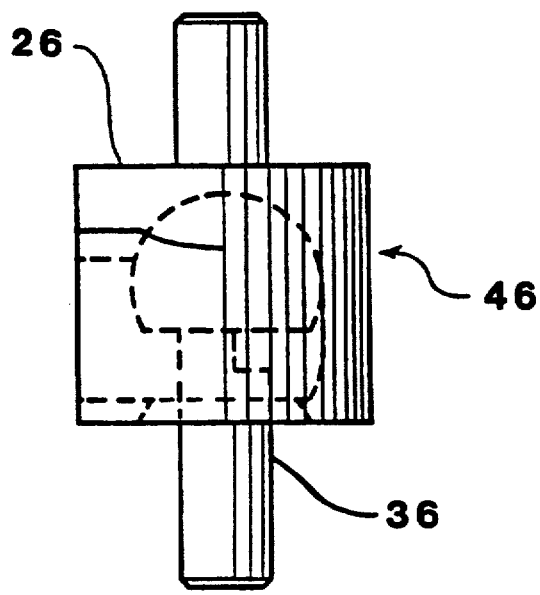
FIG. 6 illustrates how the socket and ball fit when the two are connected and the ball is seated.

FIG. 6 shows the quick release ball and socket assembly 46 which consists of the socket 26 and ball 36. The assembly is designed as a ball and socket joint so that the ball shaped head 30 is retained in the ball recess 14.

OPERATIONS-FIGS. 1, 2, 3, 4, 5, 6

The ball 36 enters the socket 26 through the ball slot 20 in the flat face 22 while the locking slot 32 is aligned with the stem slot 18 permitting the ball shaped head to enter the socket. Then the locking slot is rotated so that it no longer is in alignment with the stem slot 18. After entering the ball recess 14, the ball shaped head 30 is moved so that its centerline 31 coincides with the centerline 23 of the ball seat 24. Then the ball shaped head 30 is resting in the ball seat 24. The quick release ball and socket joint 46 is now assembled and ready for operation.

When the joint 46 is in use the ball 36 is free to rotate along the axis of the joint in the socket 26. The motion of the ball 36 along the two orthogonal axes is controlled by the stem guide 16 that bounds the stem opening 25. The ball 36 pivots in the socket 26 until the ball stem 34 makes contact with stem guide 16.

To disengage the quick release ball and socket joint 46 the ball 36 is moved so that its centerline 31 coincides with the centerline 21 of the ball slot 20. In this position the ball 36 is rotated to align the locking slot 32 with the stem slot 18 and the ball 36 is removed from the socket 26.

SUMMARY, RAMIFICATIONS, AND SCOPE

The ball joint of this invention provides a highly reliable, simple, light weight yet economical device which can be used in multiple applications.

While my above description contains many specifications, these should not be construed as limitations on the scope of the invention, but rather as an exemplification of one preferred embodiment thereof. Many other variations are possible. For example different materials, a different means of attachment such as intregal construction with the structure. Accordingly, the scope of the invention should be determined not by the embodiments illustrated, but by the appended claims and their legal equivalents.

We claim:

1. A quick release ball and socket assembly providing 3-axes pivotal movement, said assembly comprising a socket and a ball, said socket comprising a housing and a socket stem that is integrally connected to said housing, said housing being generally cylindrical in shape with a flat face on one side, said flat face having a ball slot that is substantially circular in shape, and connected to a stem slot which is generally rectangular in shape, and a centerline of said stem slot being offset from a centerline of said housing, said housing also comprising a stem opening located on the end of said housing opposite to said socket stem, said stem opening being approximately circular in shape and bounded by a stem guide which has a beveled surface forming a bottom opening of said stem guide that is larger than a top opening, said stem opening having a centerline that coincides with said centerline of said housing and said stem opening being connected to said stem slot, said housing also comprising a ball recess, said ball recess being bounded by a ball seat and said stem opening, said ball seat being generally spherical in shape and having a centerline that is offset from a centerline through said ball slot, said ball comprising a ball shaped head which is substantially spherical in shape with a radius similar to said ball slot and said ball seat, and a ball stem integrally connected to said ball shaped head, and generally the size of the top opening of said stem opening, said ball stem having a locking slot, said locking slot being a rectangular shaped recess with a top edge that is aligned with a bottom portion of said ball shaped head where said ball stem is joined, said locking slot when correctly aligned with said stem slot of said housing allows said ball shaped head to be introduced into said housing of said socket, said ball and said socket being locked together during operations when said locking slot is rotated into a position opposite to said stem slot and said ball shaped head being in contact with said ball seat, said ball and said socket being disengaged when aligning said ball shaped head with said ball slot and aligning of said locking slot with said stem slot.

2. The quick release ball and socket assembly of claim 1 wherein said stem guide has a shape so that said stem, opening can accommodate said ball stem, and said stem opening is approximately the same size at the top and bottom openings.

3. The quick release ball and socket assembly of claim 1 wherein said stem guide is shaped so said stem opening allows freedom of motion for said ball stem along any combination of axes.

4. The quick release ball and socket assembly of claim 1 wherein said socket stem is located on the side of said housing.

5. The quick release ball and socket assembly of claim 1 wherein a concave recess of said locking slot and the convex configuration of a corresponding edge of said stem slot are of complementary shapes so that said locking slot can accommodate said edge of said stem slot.

* * * * *